Figure 1:
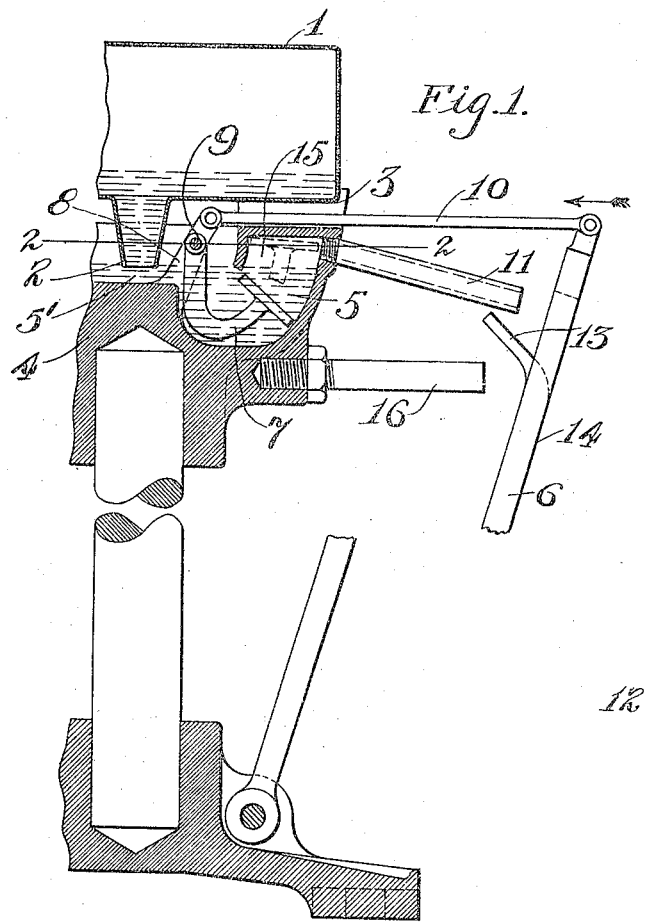

C. D. ENOCHS.
ANIMAL OILER.
APPLICATION FILED MAR. 11, 1916.

1,320,326.

Patented Oct. 28, 1919.

Inventor:
Claude D Enochs

UNITED STATES PATENT OFFICE.

CLAUDE D. ENOCHS, OF EAST SHORE PARK, MINNESOTA.

ANIMAL-OILER.

1,320,326.      Specification of Letters Patent.      Patented Oct. 28, 1919.

Application filed March 11, 1916. Serial No. 83,527.

*To all whom it may concern:*

Be it known that I, CLAUDE D. ENOCHS, a citizen of the United States, residing at East Shore Park, in the county of Washington and State of Minnesota, have invented certain new and useful Improvements in Animal-Oilers, of which the following is a specification.

This invention relates particularly to that type of animal oiler adapted to deposit a certain amount of oil on an animal that rubs against a portion of the oiler, through this act operating the oiling mechanism.

One object of my invention is to provide in an animal oiler an oil chamber, a reservoir adapted to maintain the level of the oil in the chamber substantially uniform, and means for sweeping out a definite amount of oil through a plunger action, but without employing any valves.

Another object of my invention is to provide in an animal oiler having a constant level oil chamber, a plunger sweeping in the oil and connecting links from the plunger to the rubbing post of such fashion that the movement of the rubbing post will operate the plunger.

Another object of my invention is to provide in an animal oiler having a constant level chamber, a force feed means that will operate without any valves and without any close-fitting parts that might be gummed or stuck in rough out-door service.

With these and incidental objects in view the invention consists of certain novel features of construction and combination of parts, the essential elements of which are set forth in appended claims and a preferred form of embodiment of which is hereinafter described with reference to the drawing which accompanies and forms a part of this specification.

Figure 2:
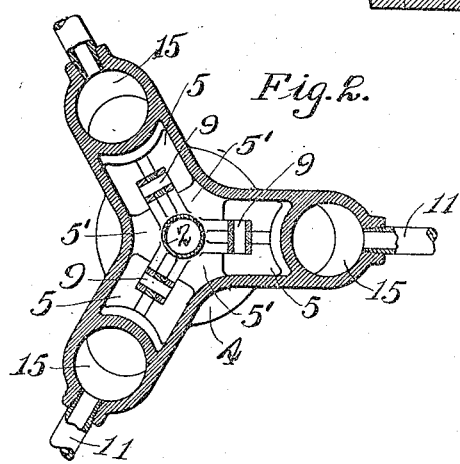

The drawing discloses in Figure 1 a side elevation partly in section of my improved oiler, with a portion of the central part of the supporting standard broken away, and in Fig. 2 a cross section taken on the line 2—2 of Fig. 1.

A tank 1, Fig. 1, having an opening at 2, but otherwise air-tight, is supported at 3 by a frame 4, so with liquid in the tank it will feed into the chambers 5 up to the level shown in Fig. 1, when the liquid will seal the opening tube, thus preventing any more liquid from flowing out of the tank 1 until a certain amount of liquid has been removed from the chamber 5, the three chambers being connected at 5', as shown in Fig. 2.

It is apparent that this construction will maintain a substantially constant level in the chamber 5, and if the animal actuated post 6 is moved in the direction of the arrow, the plunger 7 pivoted on the frame 8 at 9 and connected to the animal actuated post by the link 10 will be moved up from the position shown full in Fig. 1 to the position shown dotted in Fig. 1, sweeping with it a certain amount of liquid, which will be forced out of the nozzle 11 to the animal standing adjacent to the point 12, and any amount that is not expelled forcibly during this act will trickle slowly down on to the lip 13, and from there along the surface 14 of the animal actuated post 6, so that this liquid will eventually be deposited on the animal rubbing thereon.

The plunger 7 does not necessarily have to be a close fit to the chamber 15 in which it swings, as it is evident that even though a considerable amount of liquid leaks by the plunger, a certain amount will always be swept up ahead of the plunger and forced out of the nozzle 11, and as the level of the liquid is always maintained constant and as the motion of the plunger will always be rapid even though the motion of the animal actuated post is comparatively slow, it is evident that substantially the same amount of liquid will be delivered through the pipe 11 each time it is moved in the direction of the arrow and that no further amount will be delivered if the post is held against the stop 16 for a considerable length of time.

While I have described my invention and illustrated it in one particular design, I do not wish it understood that I limit myself to this construction, as it is evident that the application of my invention may be varied in many ways within the scope of the following claims.

Claims:

1. In an animal oiler the combination of a liquid chamber, the wall of which joins at one portion with the wall of an inverted cup so that liquid stands at the same level in said inverted cup and said chamber, a plunger sweep hinged to a support carried by said liquid chamber and adapted to swing upwardly into said inverted cup, said inverted cup having an aperture above the liquid level thereof through which oil may be swept by said plunger sweep, and animal actuated means for actuating said plunger sweep.

2. In an animal oiler the combination of a liquid chamber, an inverted cup, one portion of the wall of said liquid chamber forming a portion of the wall of said inverted cup, the remainder of the wall of said inverted cup being so fashioned that liquid in said cup and said chamber will be at the same level, a support carried by said liquid chamber, an L shaped member having a plunger sweep on its free end hinged to said support, said plunger sweep being adapted to swing into said inverted cup, and said inverted cup having an aperture above the liquid level thereof through which oil may be swept, and animal actuated means for swinging said L shaped arm.

3. In an animal oiler the combination of a liquid chamber, an inverted cup joined thereto and having one portion of its wall positioned just above the liquid level of said liquid chamber, whereby oil may stand at one level in said chamber and said inverted cup, a support carried by said liquid chamber, a plunger sweep hinged to said support and adapted to swing upwardly into said inverted cup, the inner and outer walls of said inverted cup being curved on substantially the same radii as that portion of the plunger sweep adjacent thereto, so that, during the travel of said plunger sweep, the distances between the inner and outer walls of said inverted cup and the adjacent edges of said plunger sweep remain substantially constant, and animal actuated means for swinging said plunger sweep.

CLAUDE D. ENOCHS.

Copies of this patent may be obtained for five cents each, by addressing the "Commissioner of Patents, Washington, D. C."